Dec. 17, 1968   H. M. McDONALD   3,416,227
PRECISION LAMINATED STRIPPER BLADE
Filed Oct. 5, 1966   2 Sheets-Sheet 1
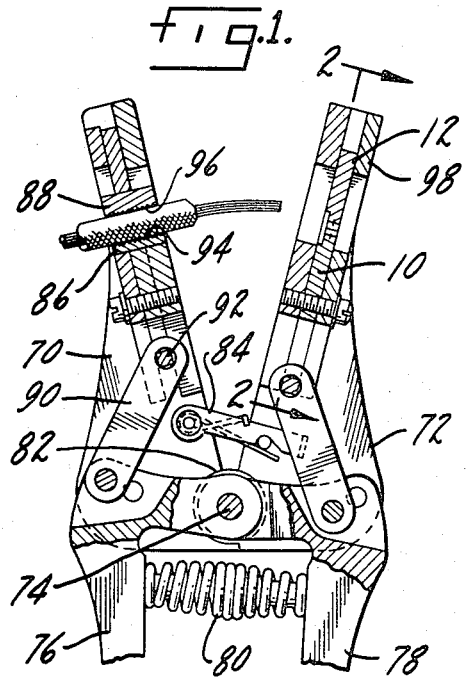
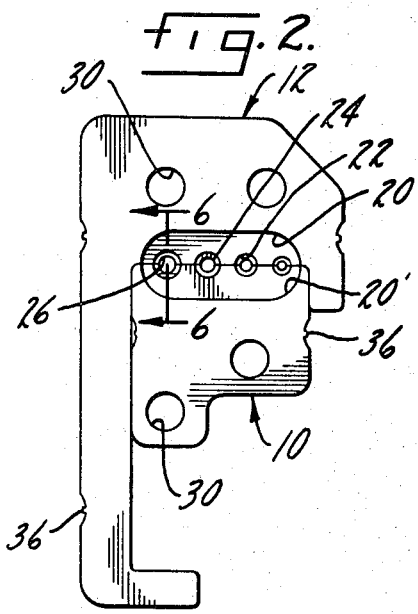
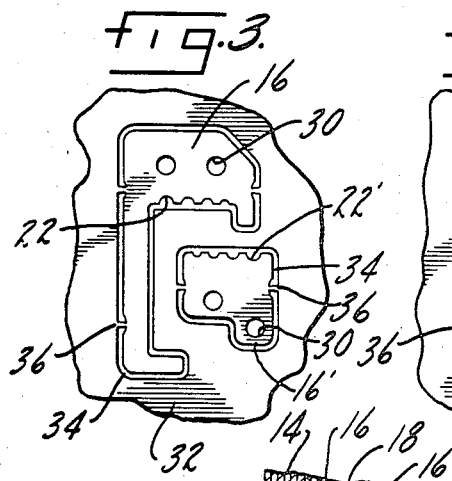
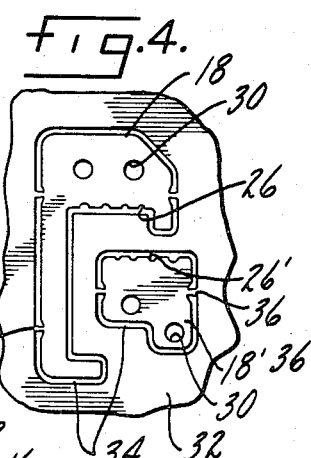
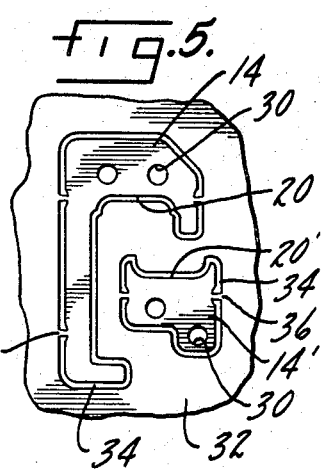
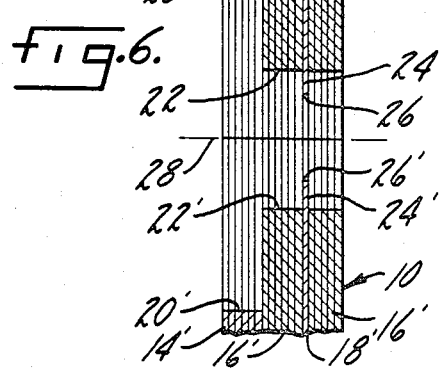
INVENTOR.
Harrison M. McDonald,
BY Parker & Carter
Attorneys.

Dec. 17, 1968  H. M. McDONALD  3,416,227
PRECISION LAMINATED STRIPPER BLADE
Filed Oct. 5, 1966  2 Sheets-Sheet 2
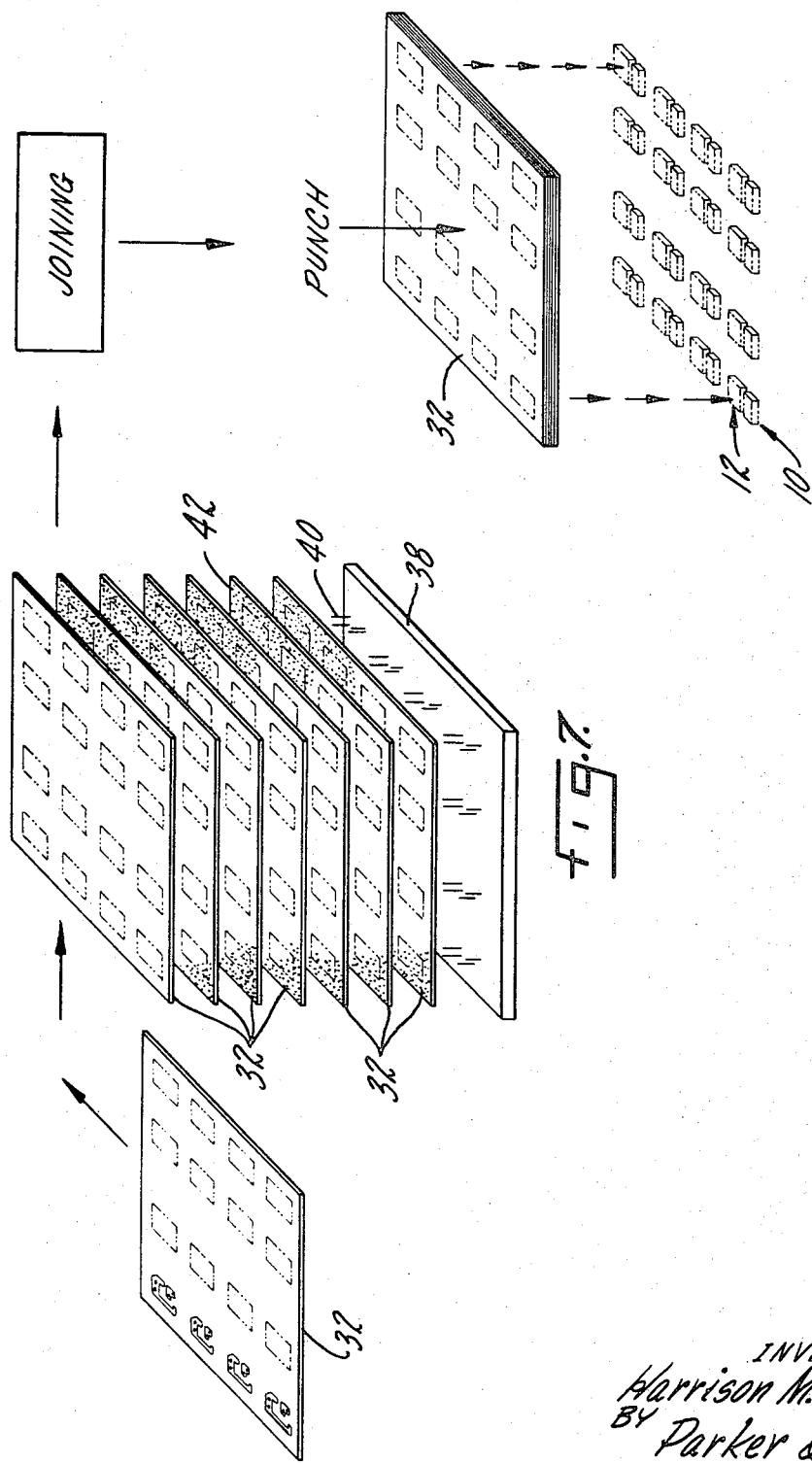
INVENTOR.
Harrison M. McDonald,
BY Parker & Carter
Attorneys.

United States Patent Office 3,416,227
Patented Dec. 17, 1968

3,416,227
PRECISION LAMINATED STRIPPER BLADE
Harrrison M. McDonald, Dekalb, Ill., assignor to Ideal Industries, Inc., Sycamore, Ill., a corporation of Delaware
Filed Oct. 5, 1966, Ser. No. 584,399
4 Claims. (Cl. 30—348)

ABSTRACT OF THE DISCLOSURE

A stripper blade which is formed by a plurality of laminates which are stacked and joined in registry. A wire insulation cutting knife may be formed by one or more laminates. The laminates may be formed to provide collets to center and grip the wire to be stripped.

---

This invention is in the field of wire strippers and is primarily concerned with a stripper blade for use with a hand operated stripper, and a method of fabricating such stripper blade. However, it should be understood that most if not all, of the features of this invention may be used as well in other types of strippers such as bench mounted strippers and/or power operated units and the like.

A primary object of this invention is a precision laminated stripper blade for wire strippers of the type generally shown in U.S. Patent No. 2,523,936 as well as the method of fabricating such stripper blade.

Another object is a method of producing precision stripper blades that eliminates precision machining operations such as deburring, drilling, counter-drilling, and reaming.

Another object is a set of stripper blades that will strip insulation from a wire without nicking the inner metallic conductor.

Another object is a highly precise and accurate stripper blade for either hand or power operated strippers.

Another object is an economical method for fabricating highly precise and accurate stripper blades.

Another object is a method of fabricating stripper blades individually and not as matched pairs.

Another object is a method of fabricating stripper blades that produces a uniform and interchangeable end product.

Another object is a method of fabricating precision stripper blades by stacking together thin photoetched or stamped blade laminates.

Another object is a set of stripper blades containing collets which insure accurate lateral centering of the cutting edges of such blades about the wire which is to be stripped.

Another object is a blade structure for strippers which causes the cutting edges to cut through the insulation at the same time.

Another object is a method of fabricating stripper blades which facilitates economical fabrication of precise and accurate stripper blades for use with special wire such as standard television antenna wire.

Another object is a method whereby special stripper blades may be produced economically on a high production basis.

Another object is a method of making stripper blades wherein a plurality of stripper blades may be produced at one time during one fabrication cycle.

Another object is a stripper blade having a cutting edge which does not require sharpening.

Another object is a method of making stripper blades which facilitates correctly marking the blade with identifying symbols indicative of the wire size to be used with each blade cutting notch.

Other objects will appear from time to time in the ensuing specification and drawings in which:

FIGURE 1 is a plan view in partial section of a hand type wire stripper utilizing exemplary stripper blades of this invention with such stripper blades shown in operation;

FIGURE 2 is an enlarged view taken along line 2—2 of FIGURE 1;

FIGURES 3–5 inclusive are plan views of exemplary outlined laminates which are utilized in fabricating exemplary forms of the stripper blade of this invention;

FIGURE 6 is a cross-sectional view taken along line 6—6 of FIGURE 2; and

FIGURE 7 diagrammatically shows the stripper blade fabrication method of this invention.

Referring now to the drawings and particularly to FIGURE 1, a partial cross-sectional view of a hand stripper of the type generally illustrated in U.S. Patent No. 2,523,936, issued Sept. 26, 1950, has been shown with exemplary stripper blades 10 and 12 of this invention installed, but it should be understood that this invention may be applied as well to a bench stripper, such as shown in U.S. Patent No. 2,239,755, issued Apr. 29, 1941. For details of the particular strippers mentioned, reference is made to the above patents. Generally, however, a wire stripper utilizing the blades 10 and 12 of this invention includes a pair of body members or arms 70 and 72 pivoted together at 74 which such pivot also functioning as the pivot for a pair of legs or handles 76 and 78. The handles 76 and 78 are spring biased apart by a suitable coil spring 80 or the like. A suitable coil spring, not shown, is provided in a housing 82 on the back of a pivot 74, each end of which is anchored into one of the arms 70 and 72 to bias such arms together at all times. For example, FIGURE 1 shows the arms 70 and 72 apart, it being understood that the coil spring around the pivot in the housing 82 is always resisting such opening movement of the arms. A suitable latch 84 either between the arms or otherwise, to initially restrain the return movement of the arms 70 and 72 is provided to allow jaws 86 and 88 to open, so that the wire can be removed after such wire has been stripped, with a certain delay period so that a stranded wire will not be frayed. For detail of the latch operation, reference is made to Patent No. 2,523,936.

In one arm 70, clamping jaws 86 and 88 are mounted with the lower jaw 86 being stationary and the upper jaw 88 being movable in the up-down direction. To provide such movement, a link 90 is pivoted on one end of the handle 76 and on its other end on a pending tail 92 of the jaw 88. The opposed faces 94 and 96 of the clamping jaws grip and hold between them the outer insulation of a wire to be stripped. While the lower jaw has been shown and described as being stationary and the upper jaw as being movable, it should be understood that it may be reversed, or, both jaws may be movable to a common central plane or axis, as shown in U.S. Patent No. 2,842,-992 issued July 15. 1958. On the other arm 72, the stripper blades of this invention are mounted with the bottom blade 10 stationary and the top blade 12 movable, although it may be reversed, or, both blades may be made movable. The arms 70 and 72 are L-shaped in cross-section with the front and outside open and the back and inside closed, thereby defining an outwardly opening pocket. The blade structure is mounted in the trough or on the outside of the L-shaped cross-section, as shown in FIGURE 1, and is suitably held in place by retainer plate 98.

With reference now to FIGURES 2 and 6, an exemplary upper stripper blade 12 has been shown as consisting of a series of blade laminates such as 14, 16, and 18 which have been stacked together in registry so as to form a clearance area 20; a collet 22; and a cutting knife 24 with the collet extending from either side of such knife edge. The exemplary lower stripper blade 10 consists of corresponding blade laminates 14', 16' and 18' having a clearance area 20', collet 22' and cutting knife 24'. The cutting knives 24 and 24' are thin laminates approximately .005 of an inch thick having notches or semi-circular holes 26 and 26' formed respectively in the edges thereof. The size and configuration of the collet 22 and 22' should conform more or less to the size and configuration of the insulation of the wire to be stripped while the diameter of the knife edge notches 26 and 26' should be slightly larger than the diameter of the inner metallic conductor of the wire to be stripped. The notches and collets in both the upper and lower stripper blade are positioned symmetrically opposed so that when the stripper blades are closed, such notches and collets, form a hole with a center line 28. Although the stripper blades have been shown as having four such sets of notches and collets, it should be understood that the stripper blades could have more or less than four sets of notches and collets depending upon the number of wire sizes the particular stripper blades are to accommodate. Further, although I have shown the collets 22 and 22' as being circular, it should be understood that such collets may have any internal configuration. For example, the collet opening may be formed to take on the shape of standard television antenna wire. Although a laminated blade structure having collets and a cutting edge formed by a single unsharpened notched laminate has been depicted and described, it should be understood that the stripper blade may be colletless, the cutting knife may consist of a plurality of blade laminates, and the cutting edge may take on any practical form such as a single or double bevel edge.

Each stripper blade lamination contains registry holes 30 which are used in registering the individual blade laminates as such laminates are stacked together. The registry holes 30 may be used to facilitate mounting of the finished stripper blade in the wire stripping device.

In FIGURES 3, 4, and 5, stripper blade laminates such as 16, 16', 18, 18', 14 and 14' which are used to form the various features of the exemplary stripper blades 10 and 12 have been shown. In FIGURE 3, the blade laminates 16 and 16', which respectively form the collets 22 and 22', have been shown. In FIGURE 4, the blade laminates 18 and 18', which respectively form the cutting knives 24 and 24' have been shown. In FIGURE 5, the blade laminates 14 and 14', which form the clearance areas 20 and 20', have been shown. Each blade laminate contains registry holes 30 which have been formed in relation to the critical features such as collets, knife edge notches, or clearance areas, so that when such laminates are stacked one upon the other such features may be properly aligned.

The individual blade laminates are formed in sheet material 32 by removing material such as at 34 so as to outline the desired form and features of each blade laminate. In removing the material around the periphery of each blade laminate so as to outline such laminate, a narrow material tab 36 connecting the outlined laminate with the residuary material sheet 32 may be left intact so that such blade laminate is retained in the residuary sheet material 32. Alternatively, the outlined blade laminate may be retained in the residuary sheet material 32 by other attachment means. For example, the material sheet may contain plastic film on one side thereof which is left intact after outlining the blade laminate by photoetching, thereby retaining such laminate to the residuary sheeet material. Removal of material around the periphery of the blade laminate, such as at 34, and the forming of the registry holes 30 may be accomplished by photoetching, stamping or other suitable process. Although the outlined upper and lower blade laminates have been shown as being retained within the residuary sheet material by three tabs and two tabs respectively, it should be understood that any desired number of tabs may be used. Further, although the respective upper and lower blade laminates have been shown as being outlined on the same material sheet, it should be understood that such blade laminates may be outlined on individual sheets.

In FIGURE 7, the method of this invention by which the laminated stripper blades are fabricated has been presented diagrammatically. The material sheets 32, containing a plurality of outlined stripper blade laminates, are stacked on a fixture 38 containing registry pins 40 so that such registry pins pass through the blade laminate registry holes 30, thereby aligning each respective stack of blade laminates. Depending upon the thickness and wire stripping area configuration desired of the finished stripper blade, material sheets 32, respectively containing different blade laminate configurations, are placed upon the fixture 38 in different order and number. For example, in constructing the upper stripper blade 14 shown in FIGURE 6, five material sheets containing the collet forming blade laminate 16 would be stacked upon the fixture 38, followed by a material sheet containing the knife edge forming blade laminate 18, six material sheets containing collet forming blade laminates 16, and six clearance areas forming blade laminates 14, in that order.

After the material sheets have been stacked upon the fixture 38 so as to form the desired stripper blade, the successive layers of laminates forming each stripper blade are joined. Joining of the laminates may be accomplished by bonding, riveting, spot-welding, or other suitable method. Joining such laminations by bonding, for example, may be effected by interposing an adhesive agent 42, such as epoxy or the like, between each successive material sheet and during such adhesive.

After joining the respective laminates forming each stripper blade, the finished stripper blades are severed from the stacked residuary material sheets by severing the tabs 36 that connect each laminate to its respective residuary material sheet. In designing the individual blade laminates, it is preferred to place the tabs 36, holding each laminate, in the same location relative to the registry holes 30 so that when such laminates are stacked, the tabs joining such laminates to their respective residuary sheet material form a column. By so locating the tabs on each blade laminate, the laminated stripper blade may be severed from the laminated residuary stock by simply punching out such connecting tabs. Although punching is the preferred method of severing the connecting tabs 36, it should be understood that such tabs may be severed using any suitable method such as cutting and the like.

The use, operation and function of the invention are as follows:

In stripping insulation from insulated wire which is to be used in electronic equipment in the defense and other industries requiring highly reliable equipment, it is essential that the insulation be stripped from such wire without nicking and thereby weakening such wire's inner metallic conductor. In producing precision stripper blades, it is highly desirable to use a fabrication method which eliminates costly machining operations in forming the stripper blade cutting means, such as collets and cutting edge notches, and which allows economical production of precision stripper blades for use in stripping special wire forms such as television antenna wire and the like.

The exemplary stripper blades 10 and 12 of this invention are utilized by mounting such blades in a stripper as shown in FIGURE 1 so that the respective cutting edge notches 26 and 26' and collets 22 and 22' of the stripper blades 12 and 10 are symmetrically opposed. The stripper blades are mounted so that the blades may open and close either by having one movable blade and one fixed blade or by having both blades movable. In stripping insulation from wires, the wire to be stripped is placed between the open blades 10 and 12 and such blades are closed about the wire so that the exposed knife edge 24 and 24' of each blade severs the wire insulation. The knife edge notch or hole 26 and 26' in each blade has a diameter slightly larger than the diameter of the inner metallic conductor of the wire to be stripped so that the cutting edge will cut through the insulation but will not nick the inner metallic conductor. The collets 22 and 22' are provided to accurately center the inner metallic conductor of the wire to be stripped within the knife edge notches 26 and 26', with such collets being generally sized to conform to the insulation of the wire to be stripped. Although the collets 22 and 22' have been shown as extending on either side of the knife edges 24 and 24', and such is the preferred construction, it should be understood that the collets may be formed in their entirety on either side of the knife edge. As previously mentioned, although a laminated blade having cutting means consisting of notches and collets has been described and depicted, such is merely an exemplary form, and the laminated stripper blade may have other cutting means. For example, the stripper blade may be colletless or may have a single or double bevel cutting edge formed by a plurality of laminates.

By fabricating the stripper blades using the method of this invention, collets and knife edge notches or other blade cutting means may be accurately fashioned in blade laminates with respect to such blade laminate registry holes so that when such blade laminates are stacked over registry pins, accurate alignment between successive blade laminates may be achieved. By stamping or photoetching the blade laminates in thin sheet material, uniformly in dimension and placement of notches and collets or other cutting edge features from one laminate to another can be achieved, thereby producing a consistently uniform finish stripper blade. Accordingly, any upper stripper blade 12 may be used in conjunction with any lower stripper blade 10. Since the stripper blades are not fabricated as matched pairs, should a stripper blade become damaged during use, it is necessary only to replace such damaged blade.

Another advantage of the fabrication method of this invention is that identifying symbols indicative of the wire size for each knife edge notch is designed may be photoetched or stamped into the blade laminates concurrent with the outlining of such laminates thereby eliminating any possibility of mismarking present when such marking is performed as a separate operation.

In the laminated stripper blade construction of this invention, since the only unsupported portion of the knife edge forming laminate 18 or 18' is the small half moon area existing between the knife edge notch 26 or 26' and the collet 22 or 22', such knife edge forming laminate may be made thin enough to cut cleanly through the wire insulation without sharpening the notch edge.

The method of fabrication of this invention permits selection of the material used to form each laminate based on the function of each laminate in the finished stripper blade. For example, the knife edge forming laminate 18 or 18' may be fabricated using a hard metal while the collet forming laminate 16 or 16' may be fabricated using a rigid plastic. Although I have previously described the knife edge laminate as being approximately .005 of an inch thick and having unsharpened knife edge notches 26 or 26', and such is the preferable form, it should be understood that such knife edge laminate may be thicker and have sharpened knife edge notches.

While the preferred form and variation of the invention have been described, it should be understood that suitable other additions, alterations, and variations may be made without departing from the invention's fundamental theme.

I claim:

1. In a blade structure for use in stripping insulation from insulated wire, and of the type having collet means for gripping and centering the wire to be stripped and insulation cutting means, the improvement comprising:
   a plurality of opposed laminates, said opposed laminates having recesses along their confronting edges, said laminates including means for stacking the laminates in registration so that the composite effect of said recessed edges forms said collet means and said cutting means, said cutting means including at least two of said opposed laminates, said two laminates having aligned cutting edges and said edges being substantially the same thickness as the body of said cutting laminates.

2. The structure of claim 1 further characterized in that said collet means are formed on both sides of said cutting means.

3. The structure of claim 1 further characterized in that each cutting means laminate is approximately 0.005 of an inch thick.

4. The improved stripper blade of claim 1 further characterized in that the recess in each cutting means laminate has a generally circular shape.

References Cited

UNITED STATES PATENTS

| | | | |
|---|---|---|---|
| 2,523,936 | 9/1950 | Axelsen | 81—9.5 |
| 3,125,909 | 3/1964 | Hindenburg | 81—9.5 |
| 3,151,509 | 10/1964 | Gormley | 81—9.5 |
| 3,262,206 | 7/1966 | Tomek | 30—346 |
| 3,274,686 | 9/1966 | Dawidowicz | 30—348 |
| 3,279,283 | 10/1966 | Craig | 76—104 |

ANDREW R. JUHASZ, *Primary Examiner.*

G. WEIDENFELD, *Assistant Examiner.*

U.S. Cl. X.R.

30—91.2, 351; 81—9.5; 76—104